INVENTORS
Alburt B. Thomas
Samuel L. Walden
BY
ATTORNEYS

Aug. 17, 1965  S. L. WALDEN ETAL  3,200,782
POWER BOAT ATTACHMENT
Filed Nov. 6, 1964  3 Sheets-Sheet 2
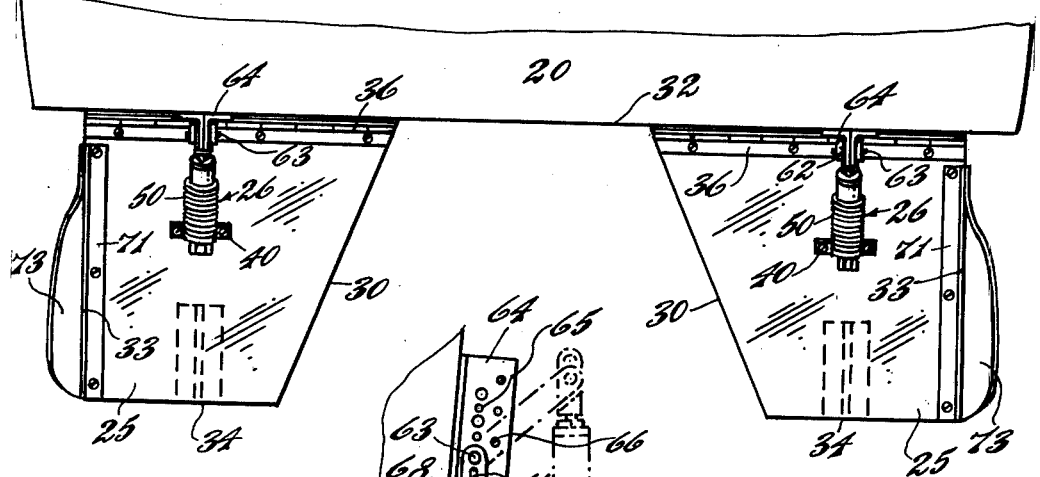
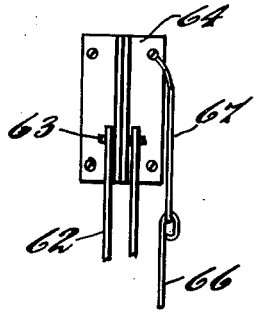
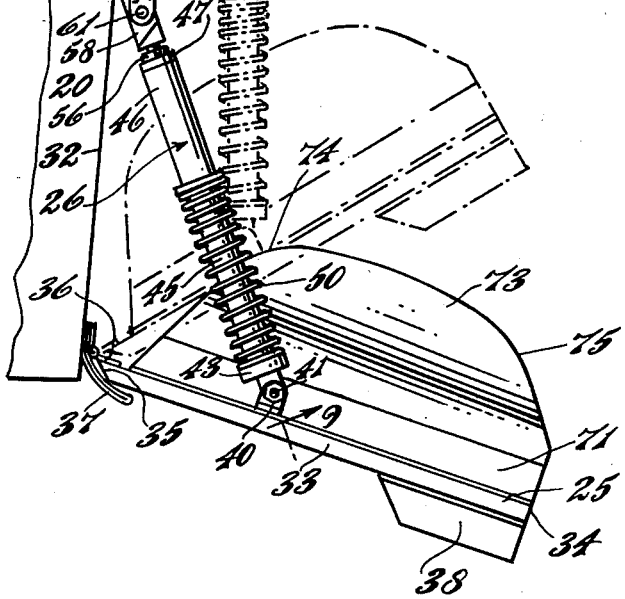
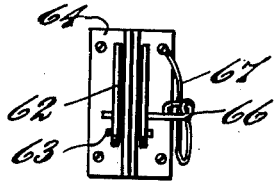
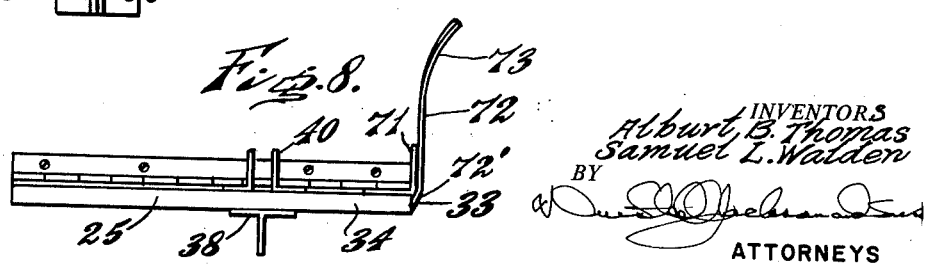
INVENTORS
Alburt B. Thomas
Samuel L. Walden
BY
ATTORNEYS Aug. 17, 1965
S. L. WALDEN ETAL
3,200,782
POWER BOAT ATTACHMENT
Filed Nov. 6, 1964
3 Sheets-Sheet 3
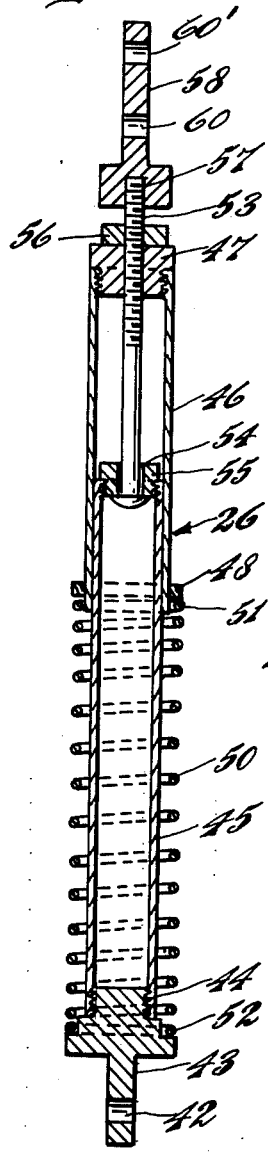
Fig. 9.
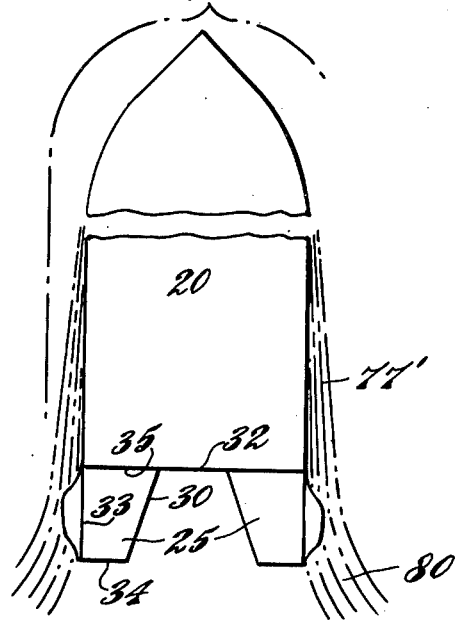
Fig. 12.
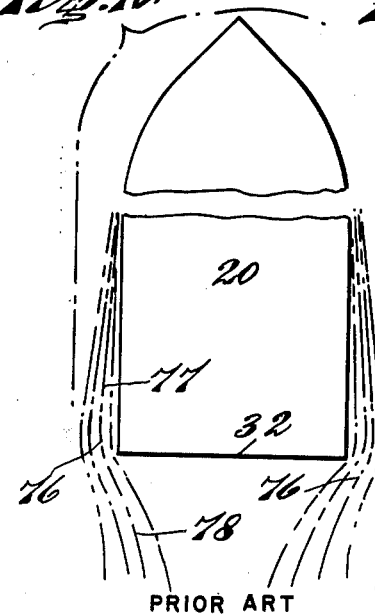
Fig. 10.
PRIOR ART
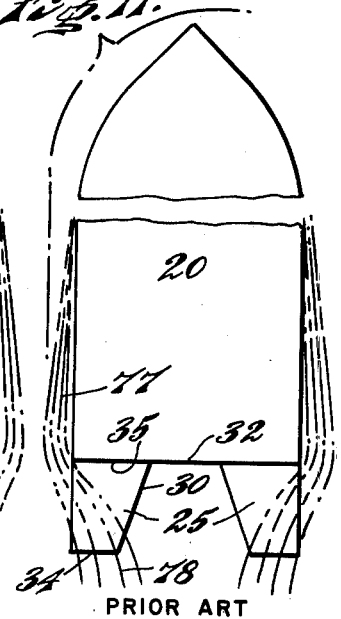
Fig. 11.
PRIOR ART
INVENTORS
Albert B. Thomas
Samuel L. Walden
BY
ATTORNEYS

United States Patent Office
3,200,782
Patented Aug. 17, 1965

3,200,782
POWER BOAT ATTACHMENT
Samuel L. Walden, 711 Shore Road, Northfield, N.J., and Alburt B. Thomas, 2143 S. Bayshore Drive, Miami, Fla.
Filed Nov. 6, 1964, Ser. No. 409,359
12 Claims. (Cl. 114—66.5)

The present invention relates to attachments for power boats to prevent the tendency to porpoise, to increase speed at a given power and to improve tracking.

The purpose of the invention is to provide elevator plates at the stern or transom of a power boat at the water line and to automatically adjust the angle of such elevator plates toward the horizontal by providing a regulator controlling the elevator plates and having co-operating plunger elements urged apart by a spring which yields and permits shortening of the regulator as more pressure is applied to the elevator plates by the water.

A further purpose is to spring bias elevator plates located at the water line adjacent to the stern or transom of a power boat so that under low load the elevator plates extend behind the boat at a substantial angle below the horizontal, and as load increases the springs yield to permit the elevator plates to assume smaller angles with respect to the horizontal.

A further purpose is to employ in the regulator a variable load spring which will increase the resistance to deflect as angular change of the elevator plates takes the place towards the horizontal at a much steeper rate than the linear rate provided by Hooke's law.

A further purpose is to reduce the turbulence of the slip stream passing on both sides of the hull at the stern of a boat and to improve the tracking or facility in steering in a straight direction by providing vanes at the outboard sides of the elevator plates which extend vertically and flare or diverge outwardly.

A further purpose is to curve the vanes on an axis which is offset with respect to the plane of the elevator plates, the axis of curvature being higher above the elevator plate at the front of the vane than it is at the rear of the vane, so that the bulk or all of the slip stream will extend beneath the vanes and be most effectively converted into a forward component.

A further purpose is to permit the helmsman to operate a power boat from the cockpit position rather than by requiring him to operate from the flying bridge by increasing the visibility from the cockpit through lowering the angle of the keel with respect to the horizontal.

A further purpose is to make a power boat ride more smoothly at a higher speed and with more economy in operation, reducing hull damage and engine damage from porpoising.

A further purpose is to adjust the initial spring load which must be overcome in order to shorten the regulator element to meet the requirements of the particular boat.

A further purpose is to provide keels extending longitudinally fore and aft beneath the bottom of the elevator plates.

Further purposes appear in the specification and in the claims.

In the drawings we have chosen to illustrate one only of the numerous embodiments in which the invention may appear, selecting the form shown from the standpoints of convenience in illustration, satisfactory operation and clear demonstration of the principles involved.

FIGURE 4 is a fragmentary top plan view of the stern or transom of a boat, equipped with the attachment of the invention.

FIGURE 5 is a side elevation of the stern or transom of a boat provided with the attachment of the invention, the solid lines showing the device in operative position and the dot-and-dash lines showing the device retracted.

FIGURE 6 is a fragmentary rear elevation of the attachment device for the regulator means in operative position but with the pin withdrawn for raising to inoperative position.

FIGURE 7 is a view similar to FIGURE 6 showing the attachment device for the regulator means in retracted position.

FIGURE 8 is a rear elevation of an elevator plate with the regulator device removed but showing one of the vanes.

FIGURE 9 is an enlarged axial section of one embodiment of the regulator device, the section being taken on the line 9—9 of FIGURE 5.

FIGURE 10 is a diagrammatic plan view of a boat operating without any elevator plates.

FIGURE 11 is a diagrammatic plan view of a boat operating with elevator plates but without vanes.

FIGURE 12 is a plan view showing a boat operating according to the present invention with elevator plates and with vanes.

Figure 1:
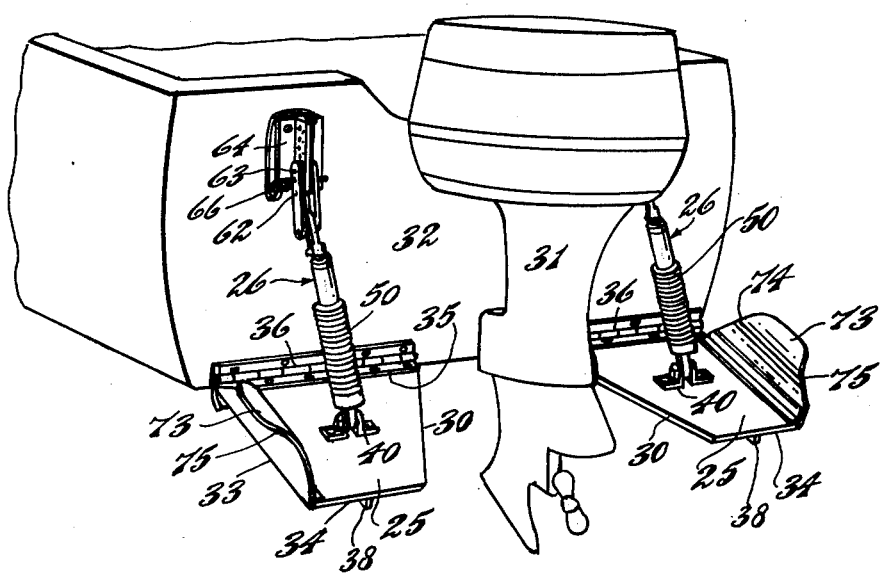
FIGURE 1 is a diagrammatic perspective showing the stern or transom of a boat provided with the elevator plates and the regulator means of the present invention.

The problem of porpoising in power boats by inability to adjust the forward and rearward angle of the keel with respect to the horizontal so that the hull tends to bump from one wave to another has received a great deal of attention and numerous attachments are on the market for mounting elevator plates at the stern or the transom of the boat.

Unfortunately, the desired angle at which elevator plates should be positioned with respect to the horizontal changes under conditions of speed, total load, distribution of load, weight, water current and the like.

For example, under light loads and slow speeds less pressure is needed to make the boat "plane" or prevent porpoising. Under heavier loads at the same speed more pressure is required to put the boat up on plane. Therefore more power has to be applied to the throttle since more pressure is developed by forward speed of the boat. If the throttle is not advanced when heavy load is applied, then the boat tends to slow down.

It is therefore important not to keep the angle with respect to the horizontal or the so called "pitch" of the elevator plates the same under all conditions. This angle or pitch should vary with the speed, the load, the distribution of the load, the wind, the water current and possibly other conditions.

Lifting force under the rear of the boat is developed by a combination of forward speed of the boat and pitch angle of the elevator plates. At slower speeds the pitch angle below the horizontal should be greater and at higher speeds the pitch angle below the horizontal should be less.

There is less lifting component from the forward speed of the boat at lower speeds, and therefore a greater pitch angle is needed to achieve the desired lift at slower speeds.

On the other hand if the correct angle established for lower speeds is retained at higher speeds a drag is developed and the bow of the boat will tend to "dig in." Accordingly, at higher speeds lower pitch angle should be established to effectively make the boat plane.

Some of the prior art devices have tried to establish and preset the pitch angle of the elevator plates, and if they have correctly established the pitch angle for one condition, an incorrect pitch angle is maintained at another condition.

Other prior art devices have attempted to provide frequent change in pitch angle by either mechanical adjustment of the pitch angle, or adjustment by means of electrical means or gas cylinder control. In the first place these latter devices depend upon the operator of the boat to make frequent and correct adjustments as conditions change, and disastrous results may be caused if the operator through inexperience, carelessness or concentration of attention on other factors of operation of the boat makes an incorrect adjustment or fails to make a required adjustment. Furthermore, such constant manual adjustment devices require extensive equipment to make the adjustment and will fail altogether if the source of power such as electricity, compressed gas or the like should fail.

The present invention makes adjustment of pitch angle of the elevator plates automatic to agree with different conditions. The elevator plates are initially set at a relatively high pitch angle which will be suitable for low speeds and light loads. In some cases this will be about 45° below the horizontal.

The regulator comprises a spring which can automatically compress as increased speeds or increased loads increase the water pressure on the elevator plates and thus adjust the elevator plates to smaller pitch angles. In the preferred embodiment at maximum speed and full load the pitch angle achieved is of the order of 10 to 15° below the horizontal.

Furthermore, it is important that the curve of spring rate not follow a straight line as dictated by Hooke's law, but that the deflection produced by a unit addition to the load tending to deflect the spring will decrease as the spring deflects. This is accomplished by employing a variable pitch helical compression spring, in itself well known in the art, so that as the spring compresses more and more of its turns will reach solid height, leaving fewer effective turns.

Furthermore, provision is made for adjusting the upset load which has to be applied to begin to deflect the spring.

The initial angle of the elevator plates can be adjusted at the time of initial installing by determining the correct point of attachment of the upper end of the regulator with the transom of the boat. With this in view, an attachment device having selective openings is provided for varying the position of the upper end of the regulator device. By fixing the position of the upper end of the regulator device it is also possible to move the elevator plates to an inoperative position in case of docking or entering a shallow channel.

It will, of course, be evident that different springs having different spring rates can be installed as required.

We have also discovered that there is a tendency for the slip stream to produce turbulence when operating a boat and thus increase the drag on forward propulsion. This turbulence also tends to make the boat difficult to handle so that frequent adjustment of steering is required.

We have discovered that more speed for a given power setting can be obtained and much better tracking can be secured so that less frequent adjustment of steering is required by providing upward and outward flaring vanes on the outboard edges of the elevator plates.

The vanes curve or flare outwardly at their upper ends. In order to have the bulk of the slip stream caught under the vanes and the turbulence or rooster tail markedly reduced, the axis of curvature of the vanes is offset or canted so that it is more remote from the elevator plate or higher at the front than it is at the rear. Likewise, waste power or drag is converted to lifting effect which further makes the elevator plates effective.

At the same time a steadying influence on the steering is imparted by the vanes which reduces the likelihood that the boat will wander off course. In our experience the number of steering corrections is reduced to about 30% in order to keep the boat satisfactorily on course.

Further improvement in tracking and avoiding variation in steering is obtained by providing keels on the lower surface of the elevator plate.

Figure 2:
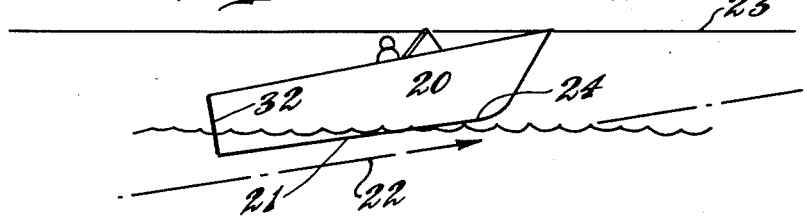
FIGURE 2 is a diagrammatic side elevation showing a boat porpoising as in the prior art.
Figure 3:
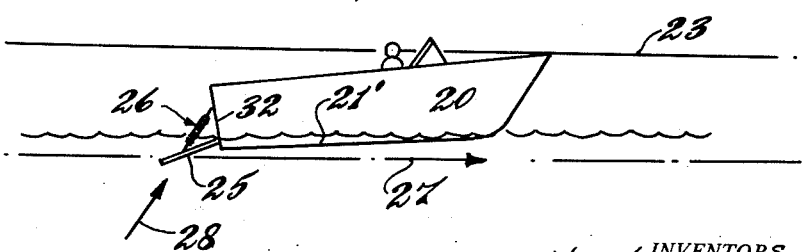
FIGURE 3 is a view similar to FIGURE 2 showing smoother operation of the boat in accordance with the present invention.

Referring now to the drawings and particularly to FIGURES 2 and 3, it will be evident that a boat 20 is there shown operating without elevator plates. The angle of keel 21 to the horizontal is indicated by a parallel arrow 22 suggesting the very steepness of the keel angle, the horizontal line being shown at 23. Under these conditions the bow of the boat is likely to jump from wave to wave as shown at 24, causing porpoising.

In operating a boat provided at opposite sides of the stern with elevator plates 25 controlled by regulator means 26 to be described, the keel 21 is less steeply inclined. This tends to make the boat operate more smoothly in a forward direction without porpoising as suggested by arrow 27.

It will be evident that as the boat progresses in the manner shown in FIGURE 3, the pressure of the water tends to exert a force upward on the elevator plates 25 as suggested by arrow 28, tending to reduce the elevator plate angle to the horizontal.

While various structures of elevator plates may be used in connection with the invention, a preferred embodiment is shown in FIGURES 1 to 8 inclusive, and FIGURE 9 shows the regulator means in some detail.

Elevator plates 25 as shown suitably have inboard edges 30 which are tapered rearwardly to avoid interference with the propulsion means 31, here shown as an outboard motor connected on the stern 32. The outboard edge 33 of the elevator plates will desirably extend parallel to the direction of progression of the boat as shown, and the rearward edge 34 of the elevator plates may conveniently be transverse to the direction.

It will, of course, be evident that it is not intended to limit to a certain contour of elevator plates.

In the crosswise direction the forward edges of the elevator plates are desirably straight at 35 and are conveniently tapered vertically as best shown in FIGURE 5 to avoid interference with the transom of the boat. One end of a hinge 36 is secured to each elevator plate adjacent the forward end, suitably by screws as shown, the opposite end of the hinge being secured also suitably by screws to the transom of the boat.

Since the downwardly open portion of the hinge may create turbulence, a flexible flap 37 (FIGURE 5) of plastic or the like is secured between the stern of the boat and the hinge and extends down over the open portion of the hinge to streamline the flow at the bottom of the elevator plate as shown.

While it will be evident that the elevator plate may be made of any suitable material, such as wood, plywood, metal, plastic or the like, it will be evident that any suitable material which is substantial enough to withstand the load and resist destruction by the water may be used.

Each elevator plate has on its lower surface preferably near the rear a keel 38 having a flange extending downward in the fore and aft direction, and suitably of T formation as shown, the cross arms of the T being anchored to the elevator plate as by screws. Aside from this keel the bottom of the elevator plate and also the top are desirably flat as shown. The elevator plate vanes and keel greatly aid in keeping the boat on a straight course.

The position of the elevator plate of the present invention is controlled by the regulator 26 which consists of mounting brackets 40 secured to the elevator plate by screws as shown and having a base flange and an upstanding flange provided with a pivot opening for receiving a pivot bolt 41 passing through pivot opening 42 in a suitable metallic end connection 43 of the regulator. The end connection suitably interconnects in any convenient way as by threading at 44 to a tubular spring guide tube 45 which telescopes within and slides with respect to an outer tubular spring guide tube 46 which is anchored suitably as by threading to an end connection 47 best seen in FIGURE 9. The spring guide tubes may be of metal or plastic.

The outer guide tube 46 has secured thereon at the outside a suitable collar 48 which forms an end spring abutment for engaging a helical compression spring 50, the opposite end of which is engaged by the end connection 43.

In the preferred embodiment the helical compression spring 50 is of the type well known in the art which departs markedly from Hooke's law, and has turns suitably at one end as shown at 51 which are relatively closer together than other turns suitably at the other end 52, so that as the spring is compressed the closely wound turns will engage one another and achieve the condition of solid height, reducing the effective number of turns and progressively increasing the stiffness of the spring. Thus, in effect, the early application of lighter loads encounters a relatively sensitive regulator which deflects to a considerable amount, but after a substantial amount of deflection when heavier loads are encountered a condition is eventually established when the spring resists further deflection except to act as a shock absorber and reduce the effect of abnormal surges in load. This point is usually reached when the elevator plate is 10 or 15° below the horizontal, starting at say 45° below the horizontal.

The connection 47 has threaded therethrough a bolt 53 whose shank passes through opening 54 in a connection 55 secured as by threading to the end of the inner telescoping guide tube 45. The bolt 53 has threaded thereon a lock nut 56 and at the end is engaged as by threading at 57 into a pivot connection 58 which has alternate pivot openings 60 and 60' for receipt of a pivot bolt 61 passing through metallic links 62.

For adjustment of the spring in retracted position, the locking nut 56 is loosened and the position of the connection 47 longitudinally of the bolt 53 is changed by rotating the connection 47 and the tube 46 in the direction desired. This shortens or lengthens the space provided for the spring 50. Then the locking nut 56 is retightened to secure the adjustment.

The metallic links 62 at their upper ends have openings which receive a pivot bolt 63 passing through a pivot opening in an anchorage 64 consisting of opposed angles or a T-bracket mounted on the stern of the boat as by screws shown.

With the regulator and the elevator plates in their lower or operative position, the links and the upper end of the regulator maintain their position as shown in FIGURE 1 and in the solid-line position of FIGURE 5 by engagement of pin 66 in a hole 68 in the links 62 and in a corresponding hole through the anchorage 64.

When it is desired to retract the elevator plate to an inactive position as shown in FIGURE 7 and as shown in dot-and-dash lines in FIGURE 5, this can be done by pulling up and out on the upper ends of the regulators, pivoting the links upward as suggested by the dot-and-dash lines in FIGURE 5, and holding the links in raised position by inserting pin 66 in a suitable opening in the links 62 inserting pin 66 through these openings to cooperate with one of the openings 65 in the anchorages passing through one of the selected adjustment openings 68 in the links. The pin 66 is held against loss by a thong 67 secured to the anchorage.

At the outboard edges of the elevator plates there are provided angles 71 extending generally in a fore and aft direction and secured as by screws to the elevator plates. These angles mount vanes 73 suitably by welding, riveting or bolting, the vanes extending upward generally straight along the outboard edge of the elevator plate until they reach a point a suitable distance above the top of the elevator plate and then curving or flaring outwardly at 73. The axis of curvature of this flared portion is suitably offset or biased so that it is higher or more remote from the elevator plate at the front than it is at the rear.

The vanes are tapered at 74 at the front to avoid interference with the transom and are suitably tapered also at 75 at the rear as best seen in FIGURE 5.

For a power boat in the range from 15 to 25 feet in length, the axis of curvature of the flare 73 is desirably 5 inches above the bottom of the elevator plate at the front and 4 inches above the bottom of the elevator plate in the rear, although it will be evident that the difference between the position of the axis at the front and the rear may vary between ½ inch and 3 inches in various boat sizes, the axis, however, being higher at the front.

For a power boat in the range between 15 and 25 feet in length, the axis should preferably be located 5 inches above the bottom of the elevator plate at the front and 4 inches at the rear, although for various sizes of boats it would be positioned anywhere from 1½ inches to 12 inches above at the front and correspondingly less at the rear.

The radius of the curvature of the flare for power boats from 15 to 25 feet in length is preferably 1¾ inches but for various sizes of power boats it can range between 1 inch and 6 inches.

The above dimensions for the vanes and their radius of curvature are merely given by way of example, and it will be evident that some advantage can be obtained from the invention notwithstanding that these are dimensions which are departed from. The vane should preferably extend straight up and be tangent with the curved part at the point where the two portions join.

The bottom of each vane as shown in FIGURE 8 is desirably bent toward the elevator plate as shown at 72' so that when it is secured tightly to the elevator plate a good seal will be made.

One of the great advantages imparted by the vanes is that they improve steering or tracking. This will be evident from FIGURES 10 to 12, where diagrammatic plan views of a boat 20 are shown. Without elevator plates the slip-streams 76 at the two sides pass close to the sides of the boat at 77 and then converge behind the boat at 78. Using elevator plates without vanes as shown in FIGURE 11 much the same condition exists, as far as the slip-stream is concerned.

As shown in FIGURE 12, however, when the vanes are used extending upwardly and curving outwardly from the outboard sides of the elevator plates, the slip-stream 77' flares outward at 80 in the wake producing a lateral force component which tends to steady the course of the boat and improve tracking, as earlier explained.

In operation of the device it will be understood that the elevator plates are installed so that they will extend down at the transom to the water line and below the horizontal at a maximum angle such as 45° when the boat is docking or traveling at idling speed. At maximum speed and full load the regulator spring will automatically shorten in length until the angle of the elevator plates is suitably of the order of 10 to 15° below the horizontal. At this angle the spring will provide substantially a rigid support against further deflection, but it will perform a shock absorber function and eliminate the effect of variation of forward driving force on operation of the boat. The effect of the elevator plates is to prevent porpoising, reduce pounding, improve smoothness of operation, and increase the speed for a given power.

At the same time the vanes give better tracking and increase the lifting force for a given power of the engine.

In view of our invention and disclosure variations and modifications to meet individual whim or particular need will doubtless become evident to others skilled in the art to obtain all or part of the benefits of our invention without copying the structure shown, and we therefore claim all such insofar as they fall within the reasonable spirit and scope of our claims.

Having thus described our invention what we claim as new and desire to secure by Letters Patent is:

1. A power boat attachment comprising elevator plate means for controlling the angle of a power boat with respect to the horizontal, hinge means connected at one side to the elevator plate means and adapted at the other side to be connected to the stern of the boat, and regulator means including spring means acting at one end against the stern of the boat and the other end against the elevator plate means, said spring means urging the two ends of the regulator means continuously apart and urging the elevator plate means toward an angular position below the horizontal and yielding under increase of load to permit the elevator plate means to assume an angular position closer to the horizontal.

2. A power boat attachment of claim 1, in combination with vanes on the outboard side of the elevator plate means extending upwardly and flaring outwardly.

3. A power boat attachment comprising elevator plate means for controlling the angle of a power boat with respect to the horizontal, hinge means connected at one side to the elevator plate means and adapted at the other side to be connected to the stern of the boat, regulator means pivotally connected at one end to the elevator plate means at a position removed from the hinge means, said regulator means including spring means resisting shortening of the regulator means incident to swinging of the elevator plate means to a position above the horizontal and urging the two ends of the regulator means continuously apart, and mounting means pivotally connected to the opposite end of the regulator means and adapted for attachment to the stern of the boat.

4. An attachment of claim 3, in which the spring means comprises variable load spring means which increases its spring resistance as it is deflected more rapidly than is provided by Hooke's law.

5. An attachment of claim 3, in which said regulator means comprises telescoping plunger elements cooperating with said spring means to guide said spring as said regulator means shortens.

6. An attachment of claim 3, in which said spring means comprises helical compression spring means.

7. In an attachment for improving the propulsion and steering of a power boat, elevator plate means adapted at the stern to be mounted for engaging the water, means for pivotally mounting said elevator means at the stern of the boat at the water line, regulator means for determining the angular relation of said elevator means below the horizontal, and vanes located adjacent to the outboard side of said elevator plate means and extending upward and in the outboard direction with respect to said elevator means.

8. An attachment of claim 7, in which said vanes extend upward and then curve in the outboard direction.

9. An attachment of claim 8, in which said vanes curve outward on a radius of curvature, the axis of curvature associated with said radius being relatively higher at the front and lower at the rear with respect to the plane of the elevator plates.

10. An attachment of claim 9, in which the regulator means comprises spring means urging the two ends of the regulator means apart and yielding under water pressure on the elevator means to permit the elevator means to move closer to the horizontal.

11. An attachment of claim 10, in which said spring means comprises a variable load spring which increases its resistance beyond that provided by Hooke's law as the regulator is shortened.

12. An attachment of claim 7, in which the elevator plate means have a keel portion extending downwardly from the lower surface and extending in a fore and aft direction.

References Cited by the Examiner

UNITED STATES PATENTS

| | | | |
|---|---|---|---|
| 2,807,228 | 9/57 | Vandre | 114—66.5 |
| 2,816,521 | 12/57 | Alexander | 114—66.5 |
| 3,066,753 | 12/62 | Hurley et al. | 114—66.5 |
| 3,124,094 | 3/64 | Braten | 114—66.5 |

MILTON BUCHLER, *Primary Examiner.*

FERGUS S. MIDDLETON, *Examiner.*